United States Patent Office 3,255,254
Patented June 7, 1966

3,255,254
1,4-DIHYDROXYBICYCLO-[2.2.2]OCTANE
James C. Kauer, Wilmington, Del., assignor to E. I. du Pont de Nemours and Company, Wilmington, Del., a corporation of Delaware
No Drawing. Filed May 1, 1961, Ser. No. 106,547
1 Claim. (Cl. 260—617)

This invention relates to 1,4-dihydroxybicyclo[2.2.2]-octane and a process for its preparation.

In polyester condensation polymers, labile substituents on the carbon atoms in the polymer chain adjacent to either side of the —O—CO— ester units represent a source of thermal instability for the polymer through elimination reactions which occur on extended heating of the molten polymer, as in fiber extrusion operations. It is highly desirable to obtain polyhydric alcohols for polyester formation in which the carbon atoms carrying the OH groups carry neither hydrogen nor a labile alkyl radical.

It has now been discovered that reaction of a 1,4-dihalobicyclo[2.2.2]octane with a metal oxide or hydroxide and water yields 1,4-dihydroxybicyclo[2.2.2]octane, a new composition of matter which meets these requirements.

1,4-dihydroxybicyclo[2.2.2]octane is a white, crystalline solid which melts at 282–283° C. At this temperature in air there is noticeable sublimation of the solid. The compound has a salty taste. It is readily soluble in water and methanol, sparingly soluble in ether, tetrahydrofuran, chloroform and hot xylene and substantially insoluble in hexane and pentane. It exhibits strong infrared absorption peaks at 3210, 2890, 2820, 1455, 1340, 1112, 1090, 968, and 873 cm.$^{-1}$ and weaker absorptions at 1300, 1245, 1160, 1050 and 995 cm.$^{-1}$ in the solid state (KBr wafer). The structure of 1,4-dihydroxybicyclo-[2.2.2]octane may be indicated as follows.

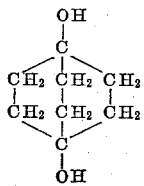

1,4-dihalobicyclo[2.2.2]octanes, such as 1,4-dichlorobicyclo[2.2.2]octane and 1,4-dibromobicyclo[2.2.2]octane, suitable for use in this invention may be prepared according to the method of Lukes and Langthaler (Coll. Czech. Chem. Comm., 24, 2109 [1959]).

1,4-dichlorobicyclo[2.2.2]octane may also be prepared from the commercially available compound, perchlorocoumalin, by reaction with ethylene (with elimination of $CO_2$), followed by partial dehalogenation and reduction of the product with hydrogen over a platinum catalyst in the presence of an alcohol as illustrated in Parts A and B of Example I.

All metal oxides and metal hydroxides are useful in the reaction of this invention. They may be used separately or in any combination of two or more such oxides and hydroxides. Thus, there may be employed the oxides and/or hydroxides of any element having an atomic number of 3,4, 11–13, 19–32, 37–51, 55–84, and 87–101 and above. Oxides and hydroxides of metals in Groups I–A, I–B, II–A, II–B, and VIII of the Deming Periodic Table are the most active in this process and, therefore, represent a preferred class. The oxides and hydroxides employed may be represented by the formulas MO, M'$_2$O$_n$ or M''(OH)$_m$, where M is a metal of valence 2, M' is a metal of valence 1, 3, 4, 5, or 6, M'' is a metal of any valence, $n$ is the valence of M' and $m$ is the valence of M''. Free metals and metal salts may also be present, but their use is not essential.

The amount of metal oxides and/or hydroxides present in the reaction mixture is not critical, although at least a stoichiometric amount of the metal compound(s) is necessary if there is to be hydrolysis of all the 1,4-dihalobicyclo[2.2.2]octane employed. As a practical matter, the use of an amount of metal compound(s) outside the range of 0.10 to 10 times the stoichiometric amount is not advantageous from the standpoint of process economy. Preferably, the oxides, and/or hydroxides are employed in an amount slightly in excess of the stoichiometric or equivalent amount, and 2 to 5 times the equivalent amount is particularly useful.

The amount of water employed in the reaction may also be varied widely. The use of at least the stoichiometric or equivalent amount necessary for hydrolysis of the 1,4 - dihalobicyclo[2.2.2]octane is preferred. Lesser amounts of water down to one tenth of the stoichiometric amount may be used but lead to lower yields of the desired product. An excess of water serves as a good medium for the reaction of this invention, and amounts in the range of one to 100 times the stoichiometric amount are preferred. There is no upper limit to the amount of water that is operable, but amounts in excess of 100 times the equivalent amount have no advantage and tend to make the product difficult to isolate.

The reaction of this invention can be carried out at any temperature in the range from 0 to 350° C. Although some of the product is formed immediately, the reaction proceeds very slowly between room temperature and 0° C.; and therefore, temperatures in the range of 100–250° C. are preferred.

In carrying out the reaction of this invention, the pressure employed is not critical. However, best yields are obtained if at least part of the water in the reaction system is in liquid form, i.e., if the reaction is conducted in the liquid phase. Thus, if a temperature above 100° C. is employed, it is preferred that superatmospheric pressure be employed, and this pressure may most suitably be the autogenous pressure obtained by operating the reaction in a closed reactor. Pressures up to 10,000 atmospheres and higher may be employed, for example, by injecting an inert gas such as nitrogen. However, pressures more than twice the vapor pressure of water at the temperature of reaction have no partciular advantage. Pressures in the range from atmospheric pressure to 5,000 lb./sq. in. are preferred.

In the following examples, parts are by weight unless otherwise specified. Example IV represents a preferred embodiment.

*Example I*

Part A:

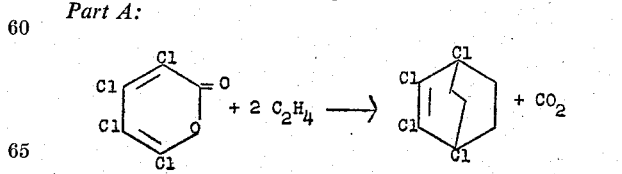

Commercial perchlorocoumalin (1500 parts) is slowly heated in a stainless steel autoclave to 170° C. under a maximum ethylene pressure of 1000 atmospheres. After 10 hours the product is cooled and distilled through a short column (B.P. 121°/3.5 mm.) to yield 1528 parts of solidified, substantially pure 1,2,3,4-tetrachlorobicyclo[2.2.2]oct-2-ene. A portion recrystallized from hexane produces white crystals melting at 95.5–96° C.

*Analysis.*—Calcd. for $C_8H_8Cl$: C, 39.1; H, 3.3; Cl, 57.7. Found: C, 39.3; H, 3.8; Cl, 57.4.

*Part B.*—A solution of 1230 parts of 1,2,3,4-tetrachlorobicyclo[2.2.2]oct-2-ene in 11,840 parts of ethanol is treated with hydrogen in a glass hydrogenation apparatus at a pressure of 40 p.s.i.g. using 20 parts of platinum oxide catalyst, care being taken to avoid contamination of the solution with metallic ions which inactivate the catalyst. Crystalline 1,4-dichlorobicyclo[2.2.2]octane deposits directly from the solution. The yield is 752 parts. A portion recrystallized from hexane melts at 233.5–234.5° C.

*Analysis.*—Calcd. for $C_8H_{12}Cl_2$: C, 53.6; H, 6.8; Cl, 39.6. Found: C, 53.9; H, 6.6; Cl, 39.4.

*Part C.*—A mixture of 305 parts of 1,4-dichlorobicyclo[2.2.2]octane, 200 parts of sodium hydroxide and 10,000 parts of water is sealed in a reactor having a total volume about 2.5 times the volume of the reactant mixture. The mixture is heated at 300° C. under autogenous pressure for 7 hours. After cooling to room temperature the resulting mixture is treated with decolorizing charcoal and filtered. The aqueous filtrate is extracted continuously with ether for three days. About 40 parts of 1,4-dihydroxybicyclo[2.2.2]octane is obtained in the form of colorless crystals. This product is sublimed at 110° C. and 0.1 mm. pressure to yield purified 1,4-dihydroxybicyclo[2.2.2]octane which melts with sublimation at 280° C. (A more highly purified product obtained after two recrystallizations from xylene melts at 282–283° C.) The proton magnetic resonance of this product shows that all hydrogens bonded to carbon are equivalent. The infrared absorption spectrum in potassium bromide shows strong absorptions at 3210 and 1112 cm.$^{-1}$, typical of hydroxyl groups. (Structure proof for 1,4-dihydroxybicyclo[2.2.2]octane is further confirmed by refluxing this product with thionyl chloride for 20 hours and thereby converting it back to 1,4-dichlorobicyclo[2.2.2]octane.)

*Analysis.*—Calcd. for $C_8H_{14}O_2$: C, 67.56; H, 9.93. Found: C, 67.81; H, 10.00.

Example II

A mixture of 537 parts of 1,4-dichlorobicyclo[2.2.2]octane, 300 parts of sodium hydroxide and 3000 parts of water is sealed in a Hastelloy B reactor having a total volume about three times the volume of the above reactant mixture. The mixture is heated at 235° C. for 12 hours under autogenous pressure. The reactor is then cooled to room temperature and the contents filtered to recover 345 parts of solid unreacted 1,4-dichlorobicyclo[2.2.2]octane. The aqueous filtrate is extracted with diethyl ether continuously for 24 hours. About 20 parts of 1,4-dihydroxybicyclo[2.2.2]octane is separated from the ether by filtration. The infrared absorption spectrum of this compound in purified mineral oil is identical to that for the product shown in Example I and exhibits a strong absorption at about 3260 cm.$^{-1}$, characteristic of a hydrogen-bonded hydroxyl group.

Examples III–VIII

In each of the following examples a mixture of 1000 parts of 1,4-dichlorobicyclo[2.2.2]octane (500 parts in Example VIII), 5000 parts of water (4000 parts in Example VIII) and the indicated metal compound or compounds is sealed in a platinum reactor having a total volume approximately two times the volume of the reactant mixture and heated under autogenous pressure at 215° C. for 14 hours. At the end of this treatment the cooled reaction mixture is filtered, and the indicated amount of 1,4-dihydroxybicyclo[2.2.2]octane is isolated by continuous ether extraction of the aqueous filtrate in the manner of Example I.

| Example | Metal-containing Materials Added | 1,4-Dihydroxybicyclo[2.2.2]octane Isolated |
|---|---|---|
| III | 800 parts cupric oxide | 240 parts (30% yield). |
| IV | 800 parts cupric oxide<br>380 parts iron | 742 parts (93.5% yield). |
| V | 1,000 parts cuprous oxide | 661 parts (83% yield). |
| VI | 500 parts ferric oxide<br>500 parts ferrous carbonate<br>500 parts iron | 370 parts (47% yield). |
| VII | 300 parts magnesium oxide<br>20 parts cuprous oxide | 60 parts (7.6% yield). |
| VIII | 1,000 parts mercuric oxide<br>100 parts mercurous chloride | 335 parts (84.5% yield). |

1,4-dihydroxybicyclo[2.2.2]octane is also obtained when, e.g., 1,4-dibromobicyclo[2.2.2]octane or 1,4-diiodobicyclo[2.2.2]octane is substituted for 1,4-dichlorobicyclo[2.2.2]octane in the procedures of Examples I–VIII. For large-scale operations, the dichloride is preferred for reasons of economy.

As illustrated by the following examples, the reaction of 1,4-dihydroxybicyclo[2.2.2]octane with the appropriate hydrohalogen acid can be used to prepare 1,4-dihalobicyclo[2.2.2]octanes, and these in turn can be reconverted to the product of the invention.

Example IX

A mixture of 50 parts of 1,4-dihydroxybicyclo[2.2.2]octane and 893 parts of 48% hydrobromic acid (in which 1 part of zinc has been previously dissolved) is heated to 150° for eight hours in a Hastelloy B autoclave. The solid product is separated by filtration, washed with water, vacuum dried, and sublimed to yield 86 parts (91% yield) of 1,4-dibromobicyclo[2.2.2]octane. A portion is resublimed and recrystallized from 1:1 benzene-hexane mixture to yield colorless crystals melting at 256.6–258° C.

*Analysis.*—Calcd. for $C_8H_{12}Br_2$: C, 35.9; H, 4.51; Br, 59.6. Found: C, 36.5; H, 4.42; Br, 59.5.

Example X

*Part A.*—The procedure of Example IX is repeated using an equivalent amount of 55% hydriodic acid in place of the hydrobromic acid. The product is 1,4-diiodobicyclo[2.2.2]octane obtained in 93% yield. A portion recrystallized from benzene melts at 245–246° C.

*Analysis.*—Calcd. for $C_8H_{12}I_2$: C, 26.6; H, 3.34; I, 70.1. Found: C, 26.7; H, 3.44; I, 69.6.

*Part B.*—A mixture of 40 parts of 1,4-diiodobicyclo[2.2.2]octane, 20 parts of ferric oxide, and 180 parts of 28% aqueous ammonium hydroxide is blanketed with nitrogen and sealed in a glass container. It is heated first at 175° C. for two hours, then at 200° C. for two hours, and finally at 225° C. for four hours. The resulting mixture is filtered and the filtrate evaporated to dryness under vacuum at room temperature to yield 35 parts of a sticky yellowish solid. This is sublimed under vacuum to yield 7.5 parts of crystalline 1,4-dihydroxybicyclo[2.2.2]octane which is identified by its infrared absorption spectrum.

1,4-dihydroxybicyclo[2.2.2]octane reacts readily with all types of polycarboxylic acids and their derivatives by means well known for preparing condensation polymers to yield polyesters. For example, when 1,4-dihydroxybicyclo[2.2.2]octane is condensed with terephthaloyl chloride or with isophthaloyl chloride, high softening polyesters are obtained. These polyesters are characterized by good thermal stability in the melt and are readily melt-extruded into films and melt-spun into fibers useful for weaving and knitting into textiles.

1,4-dihydroxybicyclo[2.2.2]octane is useful for preparing the corresponding esters by reaction with carboxylic anhydrides. These esters are liquids and low-melting solids which are useful as plasticizers for thermoplastic polymers such as polyvinyl chloride, vinyl chloride/vinyl acetate copolymers and the like. The esters are highly compatible with such polymers and are strongly resistant to blooming, blushing, or migration from such compositions. The esters of 1,4-dihydroxybicyclo[2.2.2]octane and their utility as plasticizers are illustrated by the following examples.

*Example XI*

A solution of 100 parts of 1,4-dihydroxybicyclo[2.2.2]octane in 1087 parts of acetic anhydride is heated at reflux for five hours. The resulting solution is cooled and agitated with ice to precipitate 134 parts (84% yield) of crystalline 1,4-diacetoxybicyclo[2.2.2]octane. Recrystallization from aqueous ethanol yields colorless crystals melting at 103–104.5° C.

*Analysis.*—Calcd. for $C_{12}H_{18}O_4$: C, 63,7; H, 8.0; Sap. Eq., 113. Found: C, 63.9; H, 8.0; Sap. Eq., 115, 118.

*Example XII*

*Part A.*—A mixture of 80 parts of 1,4-dihydroxybicyclo[2.2.2]octane and 299 parts of butyric anhydride is heated at 100° C. for three days. The resulting solution is diluted with 714 parts of diethyl ether and then agitated with about 5000 parts of 5% aqueous potassium bicarbonate for three hours. The organic layer is separated, washed first with 5% aqueous potassium bicarbonate, and then with water and dried over magnesium sulfate. Ether is removed under vacuum. Distillation of the residue yields 126 parts of 1,4-dibutyryloxybicyclo[2.2.2]octane in the form of a colorless, viscous liquid which boils at 99° C. (0.30 mm.); $n_D^{25}$, 1.4648; M.P. 4.6–5.1° C.

*Analysis.*—Calcd. for $C_{14}H_{26}O_4$: C, 68.05; H, 9.28. Found: C, 68.58, 68.81; H, 9.39, 9.16.

*Part B.*—A mixture of 45 parts of finely powdered polyvinyl chloride ("Geon" 101), five parts of 1,4-dibutyryloxybicyclo[2.2.2]octane, and 44 parts of methanol is thoroughly blended and the methanol is then evaporated at room temperature, followed by drying under vacuum, to yield a composition containing 10% by weight of the ester in polyvinyl chloride (Sample A). In another mixture 85 parts of polyvinyl chloride ("Geon" 101), 15 parts of 1,4-dibutyryloxybicyclo[2.2.2.]octane, and 79 parts of methanol is thoroughly blended and the methanol then evaporated at room temperature, followed by drying under vacuum, to yield a composition containing 15% by weight of the ester in polyvinyl chloride (Sample B). Separate 0.050-gram portions of the unmodified polyvinyl chloride control ("Geon" 101), Sample A and Sample B are preheated at 190° C. for 30 seconds between flat platens and then molded for 30 seconds under a total pressure of 500 pounds at 190° C. All three compositions yield clear, completely molded films in this treatment. The plasticizing action of the ester is indicated in the amount of flow exhibited by the several compositions under identical treatment. The thickness of the unplasticized control film is 5 mils, that of Sample A is 4 mils, and Sample B is 3.5 mils with a corresponding relative increase in the total area of the film. In addition, the control film is stiff and difficult to bend; whereas, the Sample A film is more pliable and the Sample B film is readily folded. The films of Sample A and Sample B show no tendency towards separation of the plasticizer on standing.

Since obvious modifications and equivalents in the invention will be evident to those skilled in the chemical arts, I propose to be bound solely by the appended claim.

The embodiments of the invention in which an exclusive property or privilege is claimed are defined as follows:

1,4-dihydroxybicyclo[2.2.2]octane.

References Cited by the Examiner
UNITED STATES PATENTS 1,206,222  11/1916  Hough _____ 260—636

OTHER REFERENCES

Applequist et al., "Chem. Revs.," vol. 54 (1954), pp. 1070–2.

Doering et al., J. Am. Chem. Soc., 75 (1953), p. 1008.

Wagner et al., "Synthetic Organic Chemistry," Wiley and Sons Inc., New York (1953), p. 170.

Walborsky et al., Jour. Am. Chem. Soc., vol 56 (1954), p. 5397.

References Cited by the Applicant

Alcott, "Richter's Organic Chemistry," Elsevier (1947), vol. I, p. 146.

Diels and Alder, Ann., 478 (sic.), 137 (1929).

E. H. Rodd, "Chemistry of Carbon Compounds," Elsevier (1951), vol. I, p. 296.

Richter's "Organic Chemistry" (Spielmann), 2nd ed., Blackiston, vol. 1, p. 109.

W. J. Hickinbottom, "Reactions of Organic Compounds," Longmans, Green and Co., London (1948), p 106.

"Physical Organic Chemistry," McGraw-Hill, 1956, p. 147.

Whitmore, "Organic Chemistry," 2nd ed., Van Nostrand, 1951, p. 116.

LEON ZITVER, *Primary Examiner.*